US010129523B2

(12) United States Patent
Michail et al.

(10) Patent No.: US 10,129,523 B2
(45) Date of Patent: Nov. 13, 2018

(54) DEPTH-AWARE REPROJECTION

(71) Applicant: MICROSOFT TECHNOLOGY LICENSING, LLC, Redmond, WA (US)

(72) Inventors: Ashraf Ayman Michail, Kirkland, WA (US); Georg Klein, Seattle, WA (US); Andrew Martin Pearson, Redmond, WA (US); Zsolt Mathe, Redmond, WA (US); Mark S. Grossman, Palo Alto, CA (US); Ning Xu, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 162 days.

(21) Appl. No.: 15/190,085

(22) Filed: Jun. 22, 2016

(65) Prior Publication Data

US 2017/0374341 A1     Dec. 28, 2017

(51) Int. Cl.
*G06T 15/00*     (2011.01)
*H04N 13/128*    (2018.01)
(Continued)

(52) U.S. Cl.
CPC .......... *H04N 13/128* (2018.05); *G06F 3/012* (2013.01); *G06T 3/60* (2013.01); *G06T 15/06* (2013.01);
(Continued)

(58) Field of Classification Search
CPC ... G06T 3/60; G06T 19/00; G06T 2219/2016; G06T 19/20; G06T 19/006;
(Continued)

(56) References Cited

U.S. PATENT DOCUMENTS 3,778,130 A    12/1973  Waters
5,917,937 A     6/1999  Szeliski et al.
(Continued)

FOREIGN PATENT DOCUMENTS

CN    102496183 A    6/2012
EP      3051525 A1   8/2016
WO  2017087088 A1   5/2017

OTHER PUBLICATIONS

Lee, Sang-Beom, and Yo-Sung Ho. "Discontinuity-adaptive depth map filtering for 3D view generation." Proceedings of the 2nd International Conference on Immersive Telecommunications. ICST (Institute for Computer Sciences, Social-Informatics and Telecommunications Engineering), 2009.*

(Continued)

*Primary Examiner* — Phu K Nguyen
(74) *Attorney, Agent, or Firm* — Alleman Hall Creasman & Tuttle LLP

(57) ABSTRACT

Examples are disclosed that relate to depth-aware late-stage reprojection. One example provides a computing system configured to receive and store image data, receive a depth map for the image data, processing the depth map to obtain a blurred depth map, and based upon motion data, determine a translation to be made to the image data. Further, for each pixel, the computing system is configured to translate an original ray extending from an original virtual camera location to an original frame buffer location to a reprojected ray extending from a translated camera location to a reprojected frame buffer location, determine a location at which the reprojected ray intersects the blurred depth map, and sample a color of a pixel for display based upon a color corresponding to the location at which the reprojected ray intersects the blurred depth map.

20 Claims, 9 Drawing Sheets

(51) Int. Cl.

| | |
|---|---|
| *H04N 13/111* | (2018.01) |
| *H04N 13/324* | (2018.01) |
| *H04N 13/332* | (2018.01) |
| *H04N 13/366* | (2018.01) |
| *G06T 3/60* | (2006.01) |
| *G06T 19/00* | (2011.01) |
| *G06T 19/20* | (2011.01) |
| *G06F 3/01* | (2006.01) |
| *G06T 15/06* | (2011.01) |

(52) U.S. Cl.
CPC ............ *G06T 19/00* (2013.01); *G06T 19/006* (2013.01); *G06T 19/20* (2013.01); *H04N 13/111* (2018.05); *H04N 13/324* (2018.05); *H04N 13/332* (2018.05); *H04N 13/366* (2018.05); *G06T 2219/2016* (2013.01)

(58) Field of Classification Search
CPC ........... H04N 13/0429; H04N 13/0422; H04N 13/0022; H04N 13/0011; H04N 13/0468
USPC ......................................................... 345/419
See application file for complete search history.

(56) References Cited

U.S. PATENT DOCUMENTS

| | | | |
|---|---|---|---|
| 5,933,125 | A | 8/1999 | Fernie et al. |
| 6,205,241 | B1 | 3/2001 | Melen |
| 6,476,803 | B1 | 11/2002 | Zhang et al. |
| 7,312,766 | B1 | 12/2007 | Edwards |
| 7,551,770 | B2 | 6/2009 | Harman |
| 7,720,277 | B2 | 5/2010 | Hattori |
| 8,711,206 | B2 | 4/2014 | Newcombe et al. |
| 8,929,645 | B2 | 1/2015 | Coffman |
| 9,083,960 | B2 | 7/2015 | Wagner et al. |
| 9,251,590 | B2 | 2/2016 | Sharp et al. |
| 9,256,926 | B2 | 2/2016 | Berretty et al. |
| 9,277,122 | B1 | 3/2016 | Imura et al. |
| 9,369,689 | B1 | 6/2016 | Tran et al. |
| 9,443,355 | B2 * | 9/2016 | Chan ........................ G06F 3/048 |
| 2003/0001838 | A1 | 1/2003 | Han et al. |
| 2010/0156901 | A1 | 6/2010 | Park et al. |
| 2012/0069205 | A1 | 3/2012 | Dowski et al. |
| 2012/0155750 | A1 | 6/2012 | Kim et al. |
| 2012/0195471 | A1 | 8/2012 | Newcombe et al. |
| 2013/0278631 | A1 | 10/2013 | Border et al. |
| 2013/0343610 | A1 | 12/2013 | Dal mutto et al. |
| 2014/0176591 | A1 | 6/2014 | Klein et al. |
| 2014/0285690 | A1 * | 9/2014 | Benedetti .................. G06T 3/00 348/241 |
| 2014/0363100 | A1 | 12/2014 | Usikov |
| 2015/0002542 | A1 | 1/2015 | Chan et al. |
| 2015/0029218 | A1 | 1/2015 | Williams et al. |
| 2015/0170418 | A1 * | 6/2015 | Flynn .................. G06F 3/04815 345/633 |
| 2015/0277121 | A1 | 10/2015 | Fridental |
| 2015/0332464 | A1 | 11/2015 | O'keefe et al. |
| 2015/0363976 | A1 | 12/2015 | Henson |
| 2015/0379772 | A1 | 12/2015 | Hoffman |
| 2017/0024900 | A1 | 1/2017 | Geiger |
| 2017/0374343 | A1 | 12/2017 | Boulton et al. |
| 2017/0374344 | A1 | 12/2017 | Boulton et al. |
| 2018/0108110 | A1 | 4/2018 | Cuervo et al. |
| 2018/0122129 | A1 | 5/2018 | Peterson et al. |
| 2018/0144547 | A1 | 5/2018 | Shakib et al. |

OTHER PUBLICATIONS

Xu X, Po LM, Ng KH, Feng L, Cheung KW, Cheung CH, Ting CW. Depth map misalignment correction and dilation for DIBR view synthesis. Signal Processing: Image Communication. Oct. 1, 2013;28(9):1023-45.*

Tam, Wa James, and Liang Zhang. "Nonuniform smoothing of depth maps before image-based rendering." In Three-Dimensional TV, Video, and Display III, vol. 5599, pp. 173-184. International Society for Optics and Photonics, 2004.*

Fehn, Christoph. "Depth-image-based rendering (DIBR), compression, and transmission for a new approach on 3D-TV." Stereoscopic Displays and Virtual Reality Systems XI. vol. 5291. International Society for Optics and Photonics, 2004.*

"International Search Report and Written Opinion Issued in PCT Application No. PCT/US2017/036927", dated Aug. 29, 2017, 11 Pages.

Raskar, et al., "iLamps: Geometrically Aware and Self-Configuring Projectors", In Proceedings of ACM Transactions on Graphics, vol. 22, No. 3, Jul. 2003, pp. 1-10.

Hilliges, et al., "HoloDesk: direct 3d interactions with a situated see-through display", In Proceedings of the SIGCHI Conference on Human Factors in Computing Systems, May 5, 2012, pp. 2421-2430.

Benko, et al., "Dyadic Projected Spatial Augmented Reality", In Proceedings of the 27th Annual ACM Symposium on User Interface Software and Technology, Oct. 5, 2014, 11 pages.

Raskar, et al., "The Office of the Future: A Unified Approach to Image-Based Modeling and Spatially Immersive Displays", In Proceedings of the 25th Annual Conference on Computer Graphics and Interactive Techniques, Jul. 19, 1998, pp. 1-10.

Sajadi, et al., "Auto-Calibrating Projectors for Tiled Displays on Piecewise Smooth Vertically Extruded Surfaces", Retrieved on: Mar. 28, 2016 Available at: http://www.ics.uci.edu/~bsajadi/files/tvcg/vr-tvcg.pdf.

Cheng, et al., "Improved Novel View Synthesis from Depth Image with Large Baseline" Industrial Technology Research Institute, Taiwan. Jul. 9, 2010, 4 pages.

Daribo, et al., "Bilateral Depth-Discontinuity Filter for Novel View Synthesis" Department of Information and Computer Science, Keio University. Oct. 4-6, 2010, 5 pages.

"Rendering in Directx", Retrieved From <<https://docs.microsoft.com/en-us/windows/mixed-reality/rendering-in-directx>>, Aug. 19, 2016, 12 Pages.

Abrash, Michael, "Down the VR Rabbit Hole: Fixing Judder", Retrieved From <<http://blogs.valvesoftware.com/abrash/down-the-vr-rabbit-hole-fixing-judder/>>, Jul. 26, 2013, 70 Pages.

Abrash, Michael, "Why Virtual Isn't Real to Your Brain: Judder", Retrieved From <<http://blogs.valvesoftware.com/abrash/why-virtual-isnt-real-to-your-brain/>>, May 15, 2013, 21 Pages.

Chuptys, et al., "Head Mounted Displays", Retrieved From <<https://pdfs.semanticscholar.org/83b5/d7a6b9846db8ef9a853e2eb41c5f4c32e4ae.pdf>>, Aug. 19, 2016, 6 Pages.

Goradia, et al., "A Review Paper on Oculus Rift & Project Morpheus", In the International Journal of Current Engineering and Technology, vol. 4, Issue 5, Oct. 2014, pp. 3196-3200.

Kim, et al., "Fast Generation of Video Holograms of Three Dimensional Moving Objects Using a Motion Compensation Based Novel Look-Up Table", In Journal of Optics Express, vol. 21, Issue 9, May 6, 2013, 17 Pages.

Manessis, et al., "Reconstruction of Scene Models from Sparse 3D Structure", In Proceedings of IEEE Conference on Computer Vision and Pattern Recognition, Jun. 15, 2000, 6 Pages.

Pelot, Anthony M., "Dynamic Blanking for Virtual Reality Image Displacement", Retrieved From <<https://pdfs.semanticscholar.org/0320/956d8657bf02940f323d447f4d8f46896c67.pdf>>, Aug. 19, 2016, 3 Pages.

Sedarat, et al., "On the Optimality of the Gridding Reconstruction Algorithm", In Journal of IEEE Transactions on Medical Imaging, vol. 19, Issue 4, Apr. 2000, pp. 306-317.

* cited by examiner

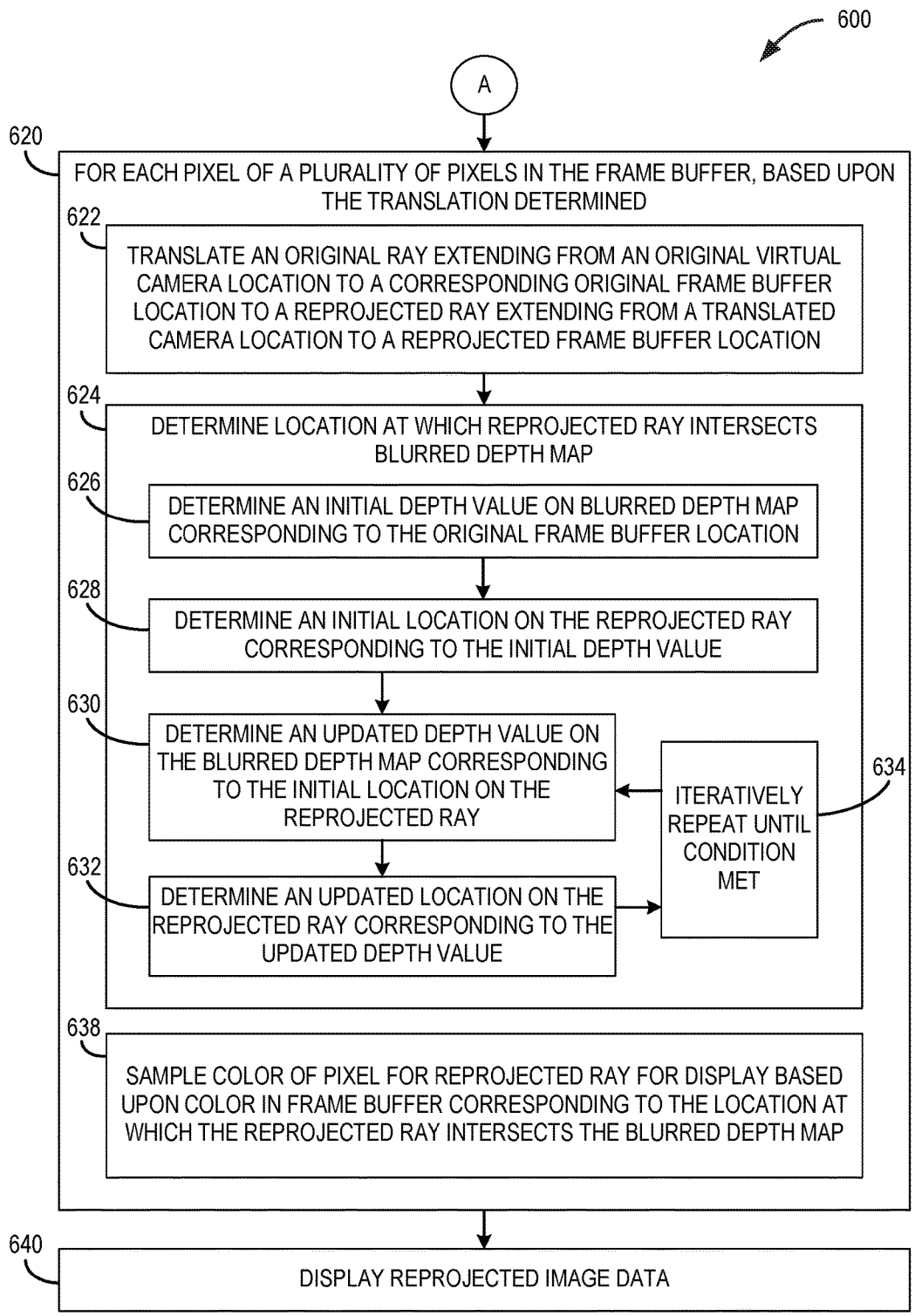

DEPTH-AWARE REPROJECTION

BACKGROUND

Head-mounted display devices and other portable display devices may be used to display immersive virtual reality and augmented reality presentations.

SUMMARY

Examples are disclosed that relate to translating, on a display device, rendered image data stored in a frame buffer prior to display based upon motion data. One example provides a computing system comprising a display, a sensor subsystem, a logic subsystem, and a reprojection subsystem configured to receive image data to be displayed via the display, receive a depth map for the image data, store the image data in a frame buffer, process the depth map to obtain a blurred depth map, and based upon motion data received from the sensor subsystem, determine a translation to be made to the image data prior to display. The reprojection subsystem is further configured to, for each pixel of a plurality of pixels in the frame buffer, translate an original ray extending from an original virtual camera location to a corresponding original frame buffer location to a reprojected ray extending from a translated camera location to a reprojected frame buffer location, determine a location at which the reprojected ray intersects the blurred depth map, and sample a color of a pixel for display based upon a color in the frame buffer corresponding to the location at which the reprojected ray intersects the blurred depth map.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A and 6B shows an example method of translating rendered image data prior to display based upon motion data.

DETAILED DESCRIPTION

Figure 1:
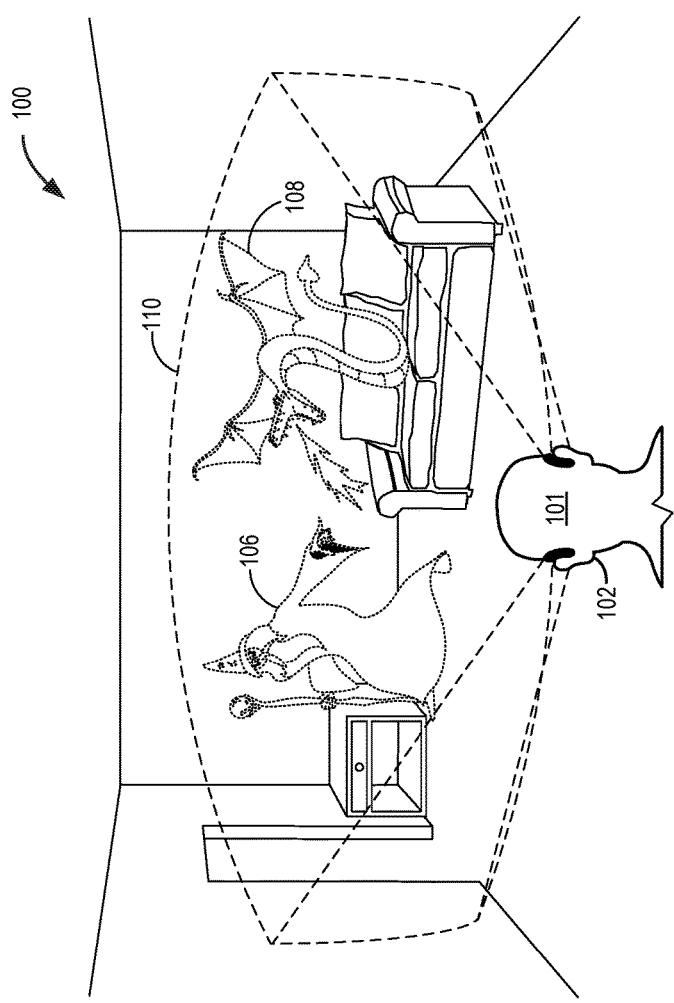
FIG. 1 shows a use scenario for an example head-mounted display device.

A virtual or augmented reality display device may render virtual images for display based on a perspective of the display device such that a virtual object appears at an intended location relative to other visible objects. For example, on a see-through head-mounted display device (HMD), a virtual object may be displayed as world-locked, such that it appears to a user of the HMD as being located at a fixed position relative to a real-world background as the user moves within the environment. FIG. 1 shows an example use scenario 100 in which a user 101 wearing an example HMD 102 is playing an augmented reality game in a room and viewing displayed virtual objects 106 and 108. HMD 102 may map the real-world environment, e.g. using image data. (depth and/or two-dimensional image data) of the real-world via an on-board image sensing system, and may render virtual objects 106 and 108 at respective locations within a field of view 110 of HMD 102 based on the resulting map. Then, as the user moves within the room, image data and/or other motion data (e.g. inertial measurement unit (IMU) data) may be used to update the position of the device with respect to the virtual objects 106 and 108, and thereby update the displayed position of virtual objects 106 and 108 as appropriate.

However, in some instances, issues related to latency between image rendering and display may affect the presentation of virtual imagery. For example, user 101 of HMD 102 may move his/her head between the time of rendering and display. In this instance, virtual objects 106 and 108 may appear to jump or otherwise move with respect to their intended locations in the real-world background due to the user's movements during this time.

One possible method of addressing such latency issues is to reproject rendered image data prior to display based on rotations and translations of a user's head. However, such methods may result in visible artifacts when used to perform translational corrections. For example, such techniques may treat content as if it were solely planar content and then apply transformations to the content from a different perspective. Thus, in frames where the content is not planar, e.g. in three-dimensional (3D) scenes where virtual objects are to appear at varying depths, virtual objects may appear to stretch or drift, as described in more detail below with regard to FIGS. 3 and 4. Further, doing late-stage reprojection and optical correction on a mobile GPU/CPU system may consume significant amounts of power that would no longer be available for application rendering. This may complicate the use of such techniques on mobile devices.

Accordingly, examples are disclosed that relate to the use of virtual object depth data in late-stage reprojection. The term "late-stage reprojection" refers to applying corrections after a scene has been rendered but before the scene is translated into photons. As described in more detail below, depth-aware late-stage reprojection applies translational corrections to rendered image data prior to display using an iterative processes involving a blurred depth map for the image data. Briefly, a corrected color of each pixel in a frame buffer of stored rendered image data may be determined by a virtual ray cast from the reprojected position of a rendering camera of the display device to a location where the ray intersects the blurred depth map. A pixel at that location in the blurred depth map then may be used to correct the color at the pixel at which the virtual ray intersects the frame buffer. Depth-aware late-stage reprojection allows the stabilization of reprojected virtual images at varying depths without the use of a full-resolution depth map, and may be operated using relatively low power consumption and memory bandwidth, making the process suitable for portable devices. Further, as described in more detail below, the disclosed reprojection methods may be configured to converge in a deterministic time per pixel. This may be advantageous in portable devices and/or special-purpose hardware, as no matter the complexity of the original rendered image, the time and power required to reproject the image have fixed upper bounds.

Prior to discussing depth-aware late-stage reprojection, a brief description of a 3D image rendering process is provided. To render virtual objects for display, a GPU of the display device maps a known 3D scene of virtual objects in a 3D world coordinate system to a two-dimensional (2D) plane in a 2D camera coordinate system. This process is known as projection transformation. The 2D plane represents the 2D view space (also referred to herein as the viewing frustum) from the perspective of the camera in the 2D camera coordinate system, which corresponds to the perspective from the display device. Portions of virtual objects in the scene that fall outside of the view space of the camera are then clipped, e.g. discarded as to not be rendered, and the 2D camera coordinate system is again transformed into a 2D "clip space" in which rays cast from the camera are transformed to be parallel and spaced apart based upon pixels at the far end of the viewing frustum. The GPU then converts the clip space into a pixel format, determines color values for the pixels based on the colors of the virtual objects in the clip space and their z-ordering, and stores the pixel color values in a frame buffer. A display then reads the color values from the frame buffer for display.

Figure 2:
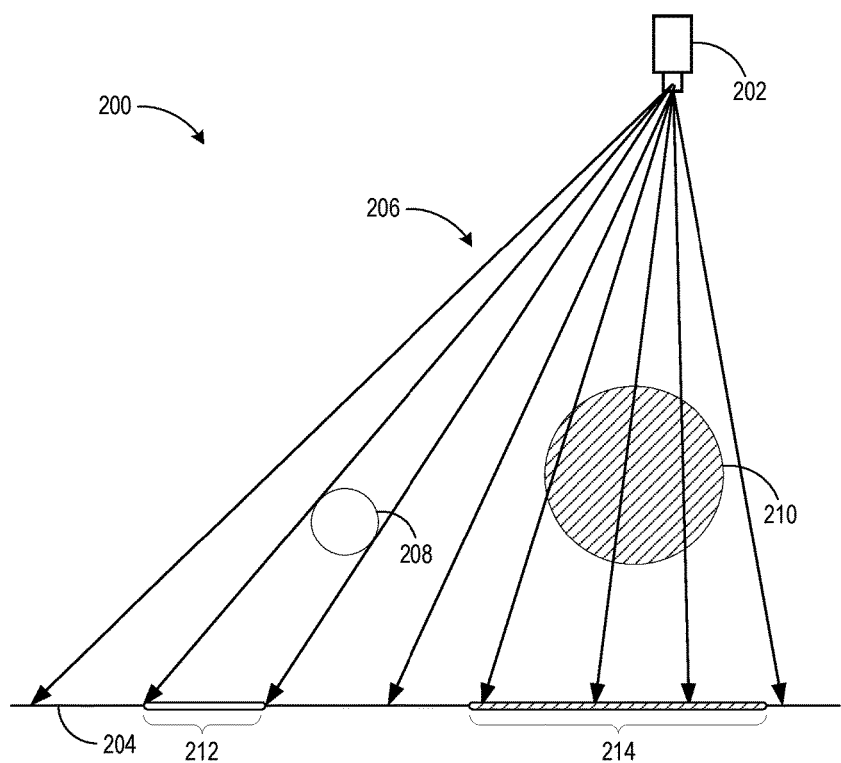
FIG. 2 shows an example two-dimensional viewing frustum for a head-mounted display device.

Image rendering and depth-aware late-stage reprojection examples are described herein in the context of 2D geometry for clarity. In 2D geometry, points in a 2D scene are mapped to one dimension. FIG. 2 schematically illustrates partial rendering of an example 2D scene 200 on a display device, where a portion of a frame buffer 204 is shown as a one-dimensional line, and a portion of a viewing frustum 206 (the field-of-view of camera 202) is represented by a fan of virtual rays. In 3D geometry, the frame buffer would be represented by a 2D plane, while the viewing frustum would be represented by an array of virtual rays. In FIG. 2, only a portion of the viewing frustum is shown for simplicity. 2D object 208 and 2D object 210 are shown as circles, representing examples of 2D objects within the 2D scene 200. The display device may render 2D objects 208 and 210 by coloring the pixels in frame buffer 204 which correspond to 2D objects 208 and 210. These pixels correspond to those that are touched by virtual rays cast from camera 202 and intersect each of 2D objects 208 and 210. For example, if 2D object 208 is a green object, then the GPU renders the pixels in frame buffer portion 212 as green, as virtual rays cast from camera 202 which intersect object 208 touch pixels within frame buffer portion 212. Likewise, if 2D object 210 is a red object, then the display device may render pixels in frame buffer portion 214 as red.

Figure 3:
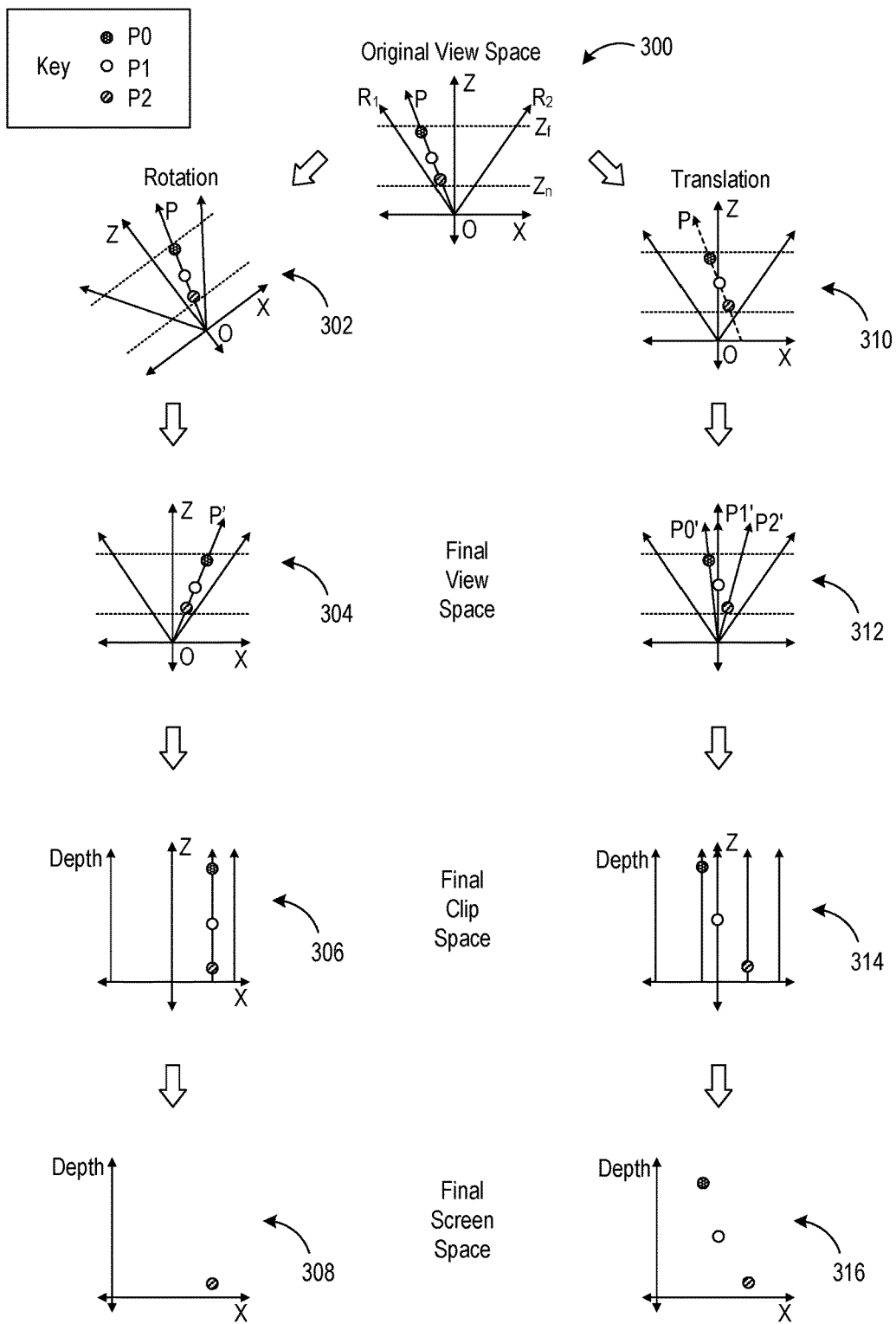
FIG. 3 shows example effects of applying rotational and translational corrections to rendered image data.

As mentioned above, a brief amount of time may exist between rendering of a virtual object and display of the virtual object, within which movements of the display device may affect the resulting displayed content. FIG. 3 shows example effects of rotational and translational changes in camera position during rendering of image data, e.g. via a GPU. At 300, an original view space is shown as a 2D representation of the field-of-view of a rendering camera within a 2D camera coordinate system, where the camera resides at the origin O. The original view space 300 contains three objects P0, P1, and P2 along a ray P cast from the camera at the origin O. Near and far clip planes, which are specified ahead of time such that only portions of virtual objects between the near and far clip planes are displayed, are shown at $Z_n$ and $Z_f$ respectively. The viewing frustum of the camera here is the region contained by the dotted lines of $Z_n$ and $Z_f$ and the two rays $R_1$ and $R_2$ extending from the camera which define the field-of-view of the camera.

Rotation of the camera is shown at 302. In the final view space after rotation, shown at 304, original ray P has been transformed to ray P', but ray P' still intersects all three points P0, P1, and P2. As such, when transformed into clip space, shown at 306, all three points maintain the same x-coordinate. The GPU may then construct a screen space representation of the scene by mapping the clip space coordinates to pixels, and determining a color for each pixel in the screen space. Assuming that each object along the original ray P is intended to be opaque, the GPU will determine the point closest to the camera as the color for that pixel. Thus, in screen space after rotation, shown at 308, P2 is determined to be the color of the pixel at the corresponding screen space location, while P0 and P1 are occluded.

In contrast, translation of the camera is shown at 310. In the final view space 312, the three points P0, P1, and P2 no longer fall on a single ray but are instead defined by new rays P0', P1', and P2' relative to the translated camera position. Thus, each point maps to a different position in clip space 314, and therefore to different pixels in screen space 316. After translational reprojection, some pixels may become occluded by the translated imagery, and some previously occluded pixels may become unoccluded. It is noted that no information regarding the color of the newly unoccluded pixels is stored in the frame buffer. However, the example depth-aware reprojection methods described below may allow colors of these pixels to be inferred more easily than when depth information is not considered.

Figure 4:
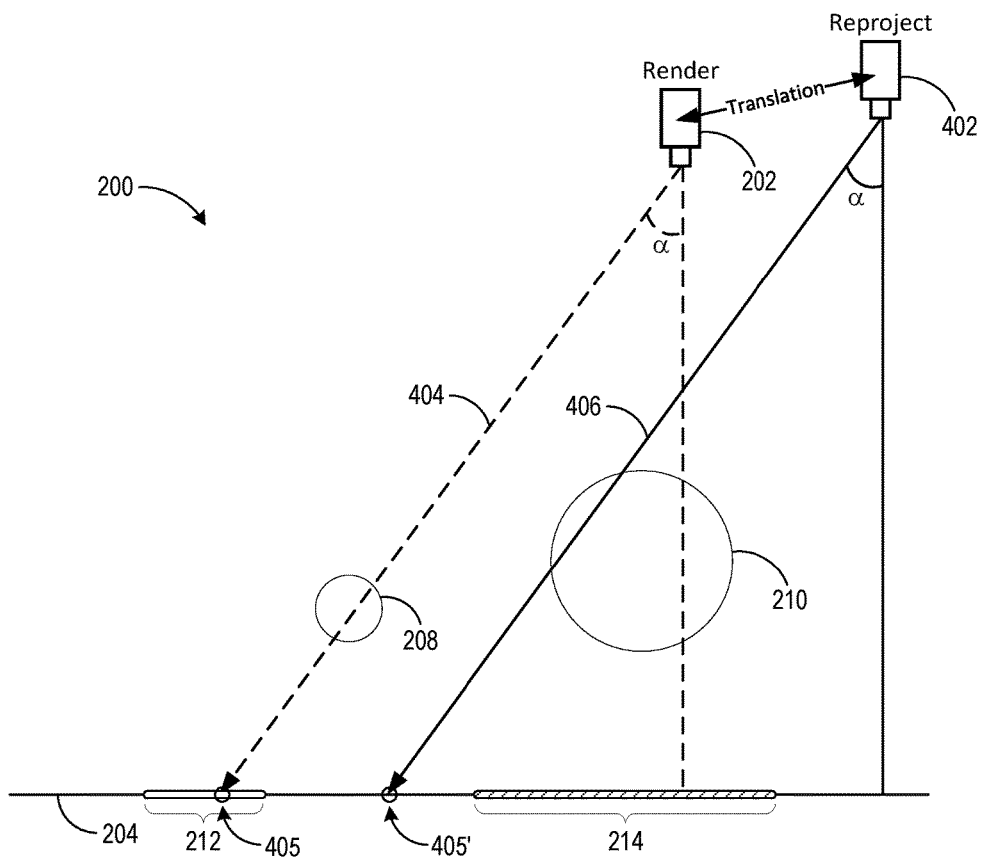
FIG. 4 shows example rays cast for a pixel from a rendering camera position and a reprojected camera position after translation.

Each pixel in the frame buffer may be identified by the angle of a ray cast from the camera extending to that pixel in the frame buffer. FIG. 4 shows an example schematic illustrating a ray cast before and after virtually translating a position of rendering camera 202 to reprojected camera 402 using non-depth-aware reprojection techniques. As in FIG. 2, where 2D object 208 is a green object in the 2D scene, the pixel at 405 in frame buffer 204 is rendered as a green pixel because ray 404 cast from rendering camera 202 to frame buffer 204 at an angle α passes through 2D object 208. This is known to the display device because both the 2D geometry of the scene as well as the camera position are available to the display device.

However, determining the correct pixel color to display after reprojection due to translation may be challenging. For example, when determining the color of a pixel based upon reprojection, the device may only have the frame buffer and a depth map for the image data available to help make the determination. In planar homography, the GPU merely translates frame buffer pixel 405 by an amount corresponding to the camera translation amount and the distance between the camera and the plane of the image, shown in FIG. 4 as pixel at 405'. As such, the GPU samples frame buffer 204 at pixel 405' and determines the reprojected color to be black, even though ray 406 cast from reprojected camera 302 extending to frame buffer 204 at angle α actually passes through 2D object 210, which is red and thus indicates that the pixel at 405' should be red. As such, planar homography may result in incorrect display of reprojected pixels due to the limited information available.

Thus, the examples disclosed herein may help to correct the issues of planar homography by utilizing a blurred depth map to achieve depth-aware late-stage reprojection. The use of a blurred depth map to inform late-stage reprojection may help to reduce a computational burden of the reprojection process, and also may help to ensure that an iterative process to locate the intersection of the reprojected ray and blurred depth map converges to a suitable degree within a relatively small and consistent number of computation cycles. This may allow such an iterative process to be implemented deterministically.

A blurred depth map may be obtained by reducing the resolution of an original depth map for the image data by a predetermined factor, and blurring the depth map via a convolution process. As one example of reducing resolution, a device may first reduce the resolution of the original depth map by a factor of two on each axis to obtain a quarter-resolution depth map, and then further reduced by a factor of four on each axis, resulting in $1/64^{th}$ of the original resolution. In other examples, any other suitable resolution reduction process may be used. Further, in some examples, the depth map received may have previously undergone at least some reduction of resolution.

Figure 5:
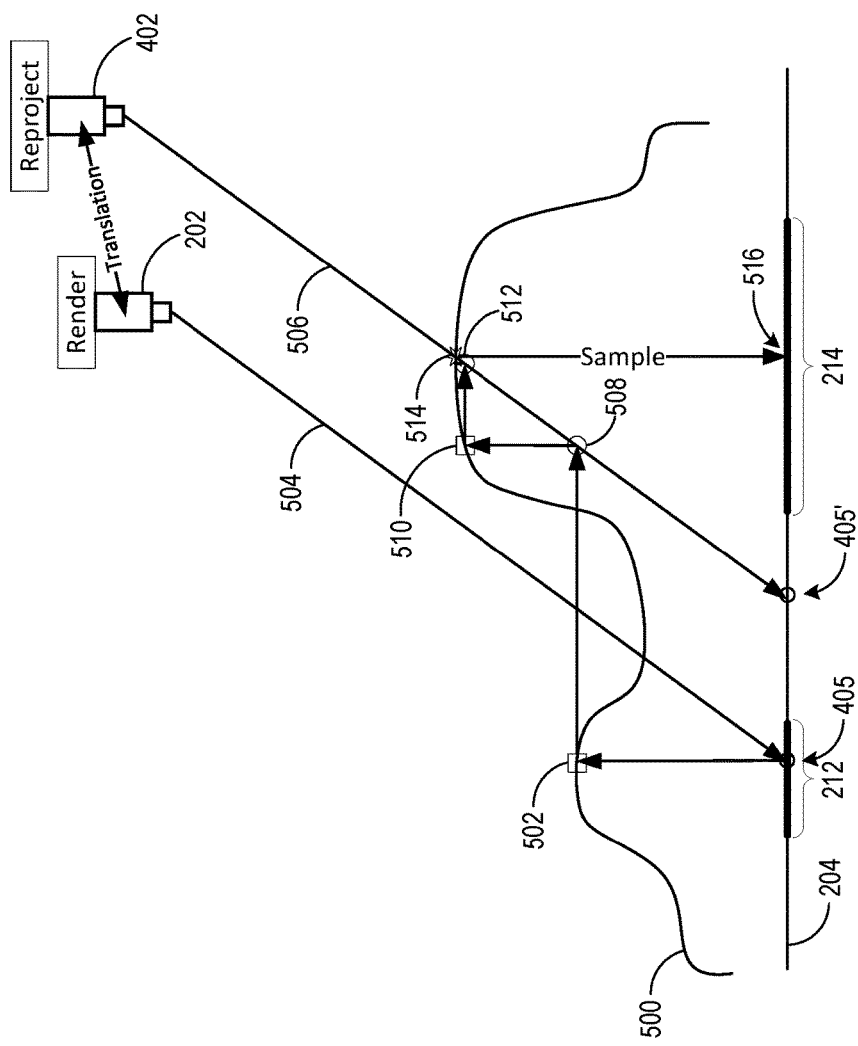
FIG. 5 shows a schematic illustration of example successive approximation steps for determining a color at a reprojected frame buffer pixel.

FIG. 5 shows a schematic representation of a blurred depth map 500 of 2D scene 200, and illustrates an example method of determining a color to sample for display using blurred depth map 500. Each pixel in frame buffer 204 maps to a corresponding entry in blurred depth map 500. Blurred depth map 500 is depicted as a curved line, where each point on the curved line corresponds to a distance between rendering camera 202 and the nearest 2D object on the ray cast to a corresponding pixel. For example, the square 502 represents the depth value on blurred depth map 500 that corresponds to pixel 405. In addition to blurring, further bounds may be applied on the size of the translation and the distance to the nearest object.

Prior to translational correction, a rotational correction may be applied. This may be visualized by tilting both the curved line (depth map 500) and the straight line (frame buffer 204) relative to rendering camera 202 based on detected rotational changes in the camera position due to head and/or device movement. Because a rotational correction transforms both the depth map and the frame buffer pixel locations equally, the mapping of each pixel to its corresponding depth value is preserved.

In contrast, as described above, translational correction relies on each pixel's depth entry to determine a translated location from which the device should sample values for the outbound frame buffer. Because each blurred depth map entry may correspond to 64 or more pixels, the device interpolates the sampling address based on the pixel address for each pixel. When rendering the original frame buffer, the device relies on the geometry of the 2D scene to determine which 2D object is closest to the rendering camera and thereby contributes the most to the depth value for each pixel. Depth-aware late-stage reprojection performs a similar process, but the depth map is used to infer the color that would have been rendered based on the 2D scene geometry. The GPU or other device performing the reprojection thus determines, for each pixel, where a reprojected ray cast from the rendering camera extending to a reprojected pixel intercepts the depth map.

The location at which reprojected ray 506 intersects blurred depth map 500 may be determined using successive approximation. In FIG. 5, the squares represent depth value estimates while the circles represent locations on the reprojected ray corresponding to depth value estimates. First, an initial depth value 502 is determined which corresponds to the original frame buffer location, illustrated as source pixel 405 along original ray 504. Then, an initial location 508 on reprojected ray 506 is determined that corresponds to initial depth value 502. Next, an updated depth value 510 on blurred depth map 500 is determined which corresponds to initial location 508 on reprojected ray 506. Next, an updated location 512 on reprojected ray 506 is determined that corresponds to updated depth value 510. The steps of determining the updated depth value on blurred depth map 500 and determining the updated location on reprojected ray may be iteratively repeated any suitable number of times. In some examples, these steps are repeated a fixed number of times, such that the iterative process is deterministic.

After a suitable or fixed number of iterative cycles, a location 514 at which reprojected ray 506 intersects blurred depth map 500 is determined. The device then samples frame buffer 500 location that corresponds to location 514, at 516 for display. Convergence to location 514 may occur fairly quickly, at least partially as a result of the blurring of the depth map. Where a fixed number of cycles is used, the number of cycles selected may depend upon how quickly the successive approximation is determined to converge to a suitable accuracy. The use of a deterministic fixed number of iterations may be a programmed parameter, and may provide various advantages. For example, the use of a fixed number of cycles helps to control an amount of processing power used for each reprojected frame of image data, and to maintain a consistent data flow through the graphics processing pipeline, in other implementations, the process may utilize a convergence threshold rather than a fixed number of iterations per pixel.

Figure 6A:
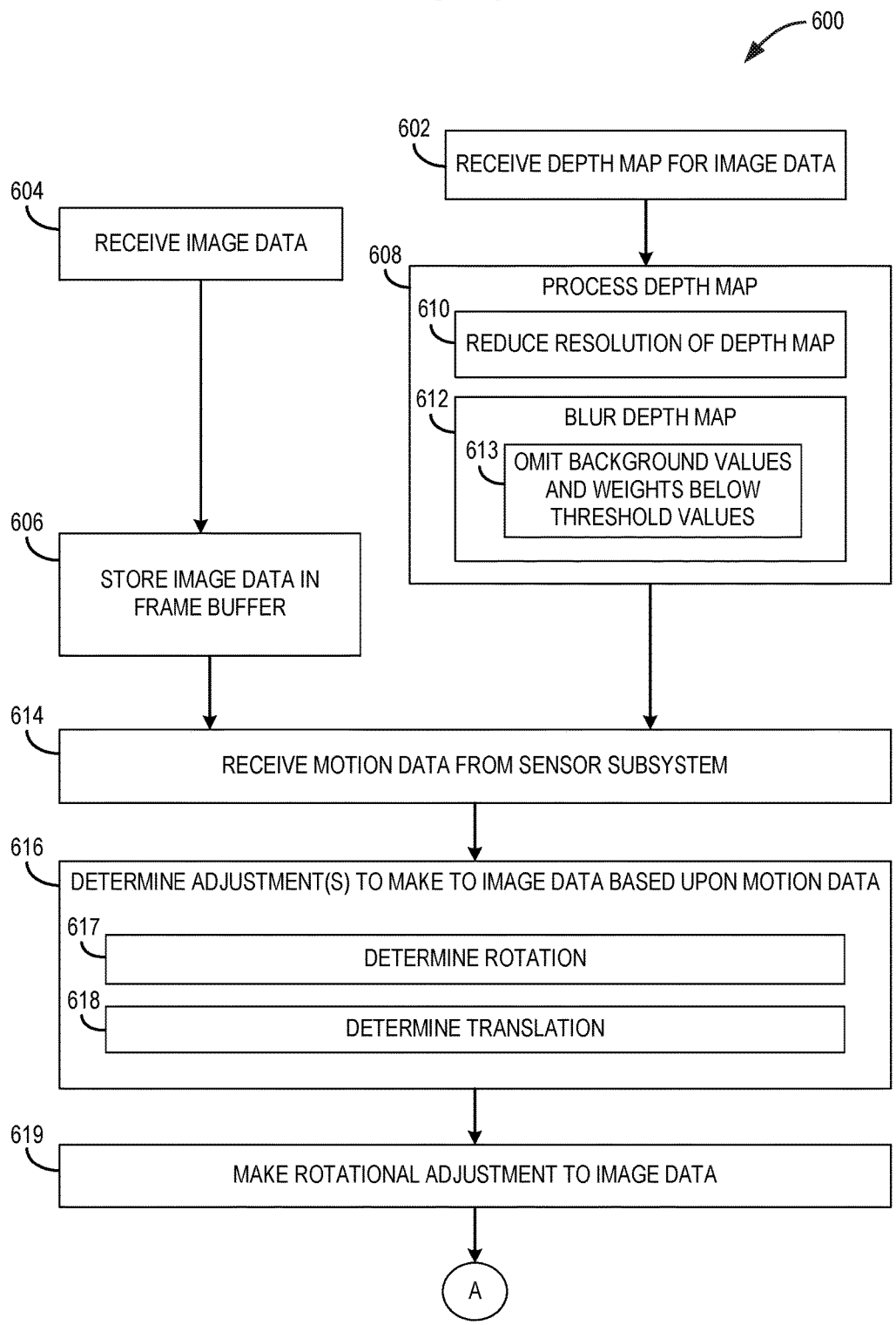

FIGS. 6A and 6B show an example method 600 of performing depth-aware late-stage reprojection. Method 600 may be enacted on a computing system having a display, such as a head-mounted display device, or on any other suitable type of display device. While described in the context of a single frame buffer, in some examples more than one frame buffer may be sampled (e.g., one frame buffer for each eye) to produce a more accurate color sample for display, as such a multiple frame buffer method may generate fewer disocclusions along the axis of the multiple samples.

Method 600 includes, at 602, receiving a depth map for the image data, and at 604, receiving image data to be displayed via a display. Such image data may include virtual objects and/or images to be displayed for a virtual or augmented reality experience. The depth map and image data each may be retrieved from local or remote storage. In various embodiments, the depth map may be received before the image data, or after the image data. Receiving the depth data first may allow translational corrections to be "streamed" out (e.g. output as the corrections are determined, rather than waiting for all corrections of the image to be completed prior to output) as the image data is received, which may help to reduce latency.

Method 600 further includes, at 606 storing the image data in a frame buffer. In parallel, method 600 includes, at 608, processing the depth map. For example, the resolution of the depth map may be reduced, as shown at 610, and the depth map may be blurred, as shown at 612. In some examples, background values and weights below threshold values may be omitted during the depth map blur convolution, as indicated at 613, which may increase accuracy in augmented reality scenarios along silhouettes of objects. In other examples, such background values and weights may be utilized instead of omitted.

Next, method 600 includes, at 614, receiving motion data from a sensor subsystem. The motion data may comprise any suitable sensor data indicative of motion, including but not limited to data received from or derived from one or more depth sensors, two-dimensional image sensors, inertial measurement units, and/or eye position sensors. Such motion data may be utilized to determine any adjustment(s) to be made to the rendered image data via late-stage reprojection, as shown at 616, which may include determining a rotation at 617 and/or determining a translation at 618. If applicable, method 600 may include, at 619, making a rotational adjustment to the rendered image data based upon the rotation determined at 617.

Continuing with FIG. 6B, method 600 includes, at 620, for each pixel of a plurality of pixels in the frame buffer, based upon the translation determined, translating an original ray extending from an original virtual camera location to a corresponding original frame buffer location to a reprojected ray extending from a translated camera location to a reprojected frame buffer location. In some examples, this may be performed for all pixels in the frame buffer, while in other examples, this may be performed on a basis other than per-pixel. For example, the translation may be performed at the resolution of the blurred depth map, and then interpolated to full resolution. FIG. 4, described above, shows an original ray 404 translated to reprojected ray 406.

Method 600 further includes, at 624, determining a location at which the reprojected my intersects the blurred depth map. As described herein, this location may be determined via successive approximation. As an example, method 600 may include, at 626, determining an initial depth value on the blurred depth map corresponding to the original frame buffer location, and at 628, determining an initial location on the reprojected ray corresponding to the initial depth value. Then, method 600 includes, at 630, determining an updated depth value on the blurred depth map corresponding to the initial location on the reprojected ray, and at 632, determining an updated location on the reprojected my corresponding to the updated depth value. As indicated at 634, method 600 may comprise iteratively repeating steps 630 and 632 until a specified condition is met. For example, steps 630 and 632 may be iteratively repeated for a fixed number of times for each pixel in a deterministic manner. In other examples, successive approximation may be carried out in a non-deterministic manner, for example by repeating iterations until a convergence threshold is reached.

For each pixel in the frame buffer, method 600 further includes, at 638, sampling a color of a pixel for the reprojected frame buffer location based upon a color in the frame buffer corresponding to the location at which the reprojected ray intersects the blurred depth map. Method 600 then includes, at 640, displaying the reprojected image data. It will be understood that the depth-aware late-stage reprojection process as disclosed herein may be implemented for each eye of the user using data from the perspective of each eye, in the case of a stereoscopic HMD.

Figure 7:
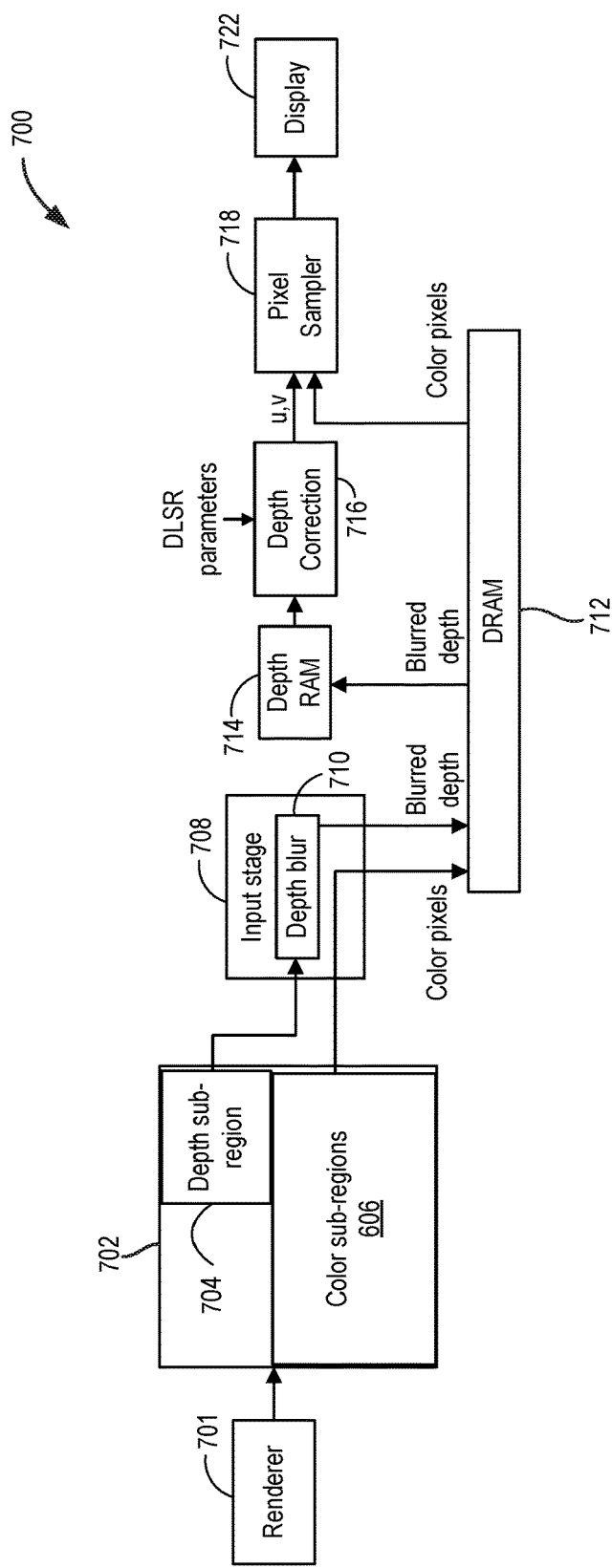
FIG. 7 shows a block diagram of example depth-aware reprojection processing system.

FIG. 7 shows a block diagram of an example depth-aware late-stage reprojection system 700 that may be used to implement the example depth-aware late-stage reprojection process described above. System 700 may be implemented on any suitable computing system, including but not limited to a HMD. System 700 includes a renderer 701 for rendering image data, e.g. via a host GPU or CPU, which outputs an image data superframe 702 comprising a depth sub-region 704 and color sub-regions 706 for virtual images to be displayed. The depicted superframe 702 illustrates an example of an arrangement of depth and color sub-regions. In other examples, these subregions may be arranged in any other suitable manner. In this example, depth sub-region 704 has been downsampled, and thus occupies a smaller portion of superframe 702 than the color image data. In other examples, the depth sub-region 704 may be sent to the input stage 708 as full fidelity depth data without initial downsampling.

The superframe 702 is received at input stage 708. Input stage 708 includes a depth map blurring module 710 that further downsamples and also blurs the depth data, and subsequently outputs blurred depth data and color pixel data to a frame buffer shown as dynamic random access memory (DRAM) 712. Blurred depth data is fluffier provided to depth random access memory (RAM) 714, from which depth correction module 716 may retrieve the blurred depth data for performing depth-aware late-stage reprojection (DLSR). The DLSR process is shown as utilizing parameters input to the depth correction module 716. Examples of such parameters may include unprojected sampling coordinates (unprojected u, v coordinates), dimensions of the depth map, rotation and translation values as determined from motion tracking, scale factors between the frame buffer and the blurred depth data, and scale factors between the blurred depth data and output display dimensions. As an example, pixel 405 of FIG. 5 corresponds to the unprojected sampling coordinates in the color plane, which are used as input to depth correction module 716. Depth correction module 716 further may apply suitable corrections to the blurred depth data, such as a bilateral filter and/or a Gaussian filter.

Depth correction module 716 outputs the corrected, reprojected sampling coordinates (shown as u, v indices) to pixel sampler 718, which informs the pixel sampler 718 of what colors to use for the pixels. As an example, pixel 516 of FIG. 5 corresponds to the reprojected sampling coordinates in the color plane, which are output to pixel sampler 718. The colored pixels are then output to display 722.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
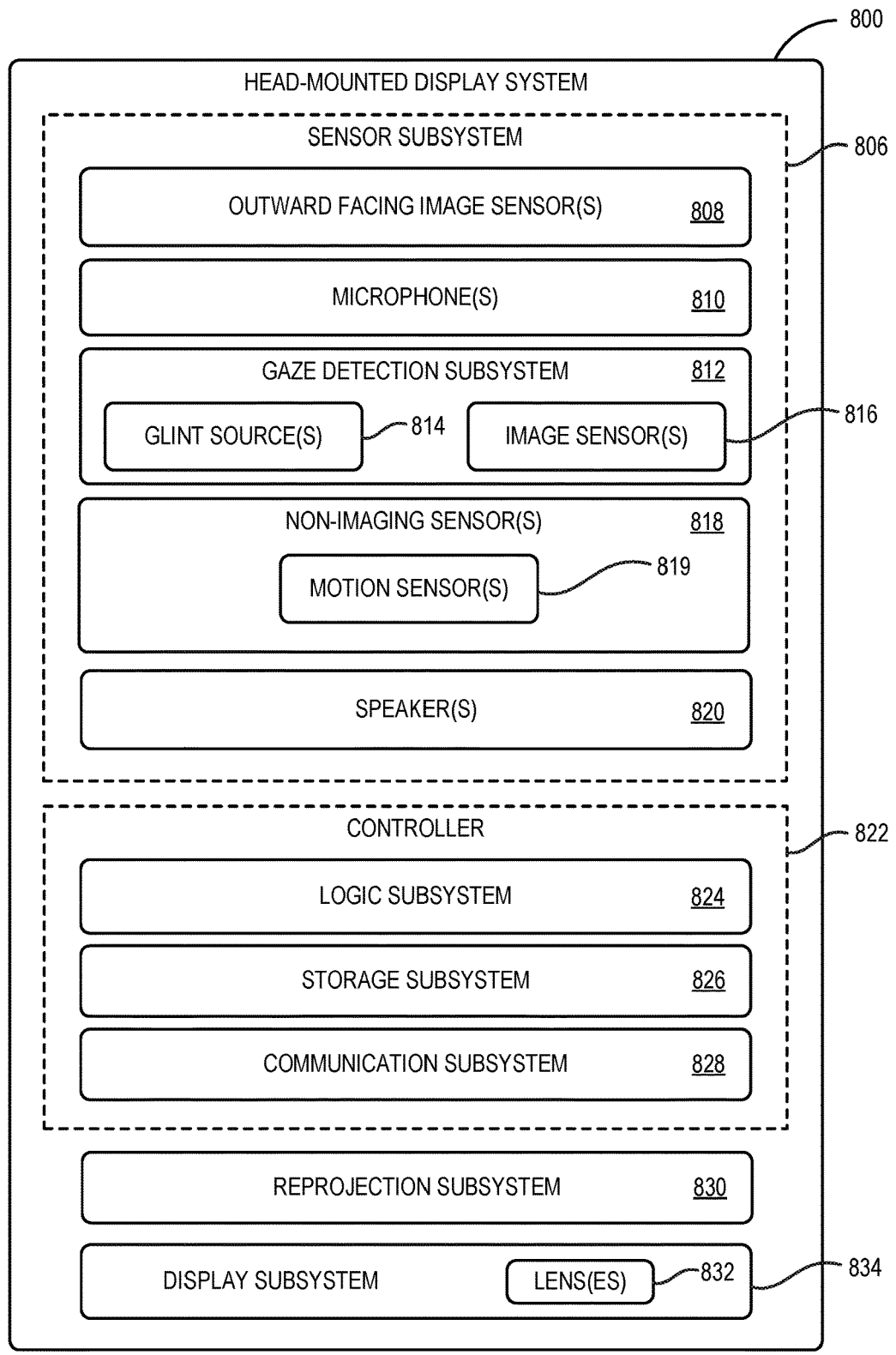
FIG. 8 shows a block diagram of an example head-mounted display system.

FIG. 8 shows a block diagram of an example head-mounted display system 800. The head-mounted display device 102 represents an example implementation of head-mounted display system 800 in which the depth-aware reprojection examples described herein may be implemented. Display system 800 includes a sensor subsystem 806, which may include one or more outward-facing image sensors 808 configured to acquire images of a real-world environment, such as to help determine the position of the display system 800 relative to the real-world environment, and one or more microphones 810 configured to detect sounds, such as user speech inputs. Outward-facing image sensors 808 may include one or more depth sensor(s) and/or one or more two-dimensional image sensor(s) (e.g. RCB image sensors). Head-mounted display system 800 may display completely virtual images, may display video-based augmented reality images via a viewfinder mode using data from an outward-facing image sensor, or may display augmented reality images (e.g. mixed reality images) via a see-through display subsystem.

Sensor subsystem 806 may further include a gaze detection subsystem 812 configured to detect a gaze direction of a user, e.g. as user input for computing device actions. Gaze detection subsystem 812 may be configured to determine gaze directions of each of a user's eyes in any suitable manner. For example, in the depicted embodiment, gaze detection subsystem 812 comprises one or more glint sources 814, such as infrared light sources configured to cause a glint of light to reflect from each eyeball of a user, and one or more image sensor(s) 816, such as inward-facing sensors, configured to capture an image of each eyeball of the user. Changes in the glints from the user's eyeballs and/or a location of a user's pupil as determined from image data gathered via the image sensor(s) 816 may be used to determine a direction of gaze. In other examples, gaze detection subsystem 812 may be omitted.

Display system 800 also may include additional sensors, as mentioned above. For example, display system 800 may include non-imaging sensor(s) 818, examples of which may include but are not limited to a global positioning system (GPS) sensor, and one or more motion sensor(s) 819, such as an accelerometer, a gyroscopic sensor, and/or an inertial measurement unit (BPI). Such sensor(s) may be used in determining image display adjustments to make via late-stage reprojection.

Motion sensors 819, as well as microphone(s) 810 and gaze detection subsystem 812, also may be employed as user input devices, such that a user may interact with the display system 800 via gestures of the eye, neck and/or head, as well as via verbal commands. It will be understood that sensors illustrated in FIG. 8 are shown for the purpose of example and are not intended to be limiting in any manner, as any other suitable sensors and/or combination of sensors may be utilized.

Display system 800 further includes one or more speaker(s) 820, for example, to provide audio outputs to a user for user interactions. Display system 800 further includes a controller 822 having a logic subsystem 824 and a storage subsystem 826 in communication with the sensors, a communication subsystem 828, and/or other components.

Logic subsystem 824 includes one or more physical devices configured to execute instructions. For example, logic subsystem 824 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 824 may include one or more processors configured to execute software instructions. Additionally or alternatively, logic subsystem 824 may include one or more hardware or firmware logic subsystems configured to execute hardware or firmware instructions. Processors of logic subsystem 824 may be single-core or multi-core, and the instructions executed thereon may be configured for sequential, parallel, and/or distributed processing. Individual components of logic subsystem 824 optionally may be distributed among two or more separate devices, which may be remotely located and/or configured for coordinated processing. Aspects of logic subsystem 824 may be virtualized and executed by remotely accessible, networked computing devices configured in a cloud-computing configuration.

Storage subsystem 826 includes one or more physical devices configured to hold instructions executable by the logic subsystem to implement the methods and processes described herein, e.g. to perform various tasks related to depth-aware late-stage reprojection. When such methods and processes are implemented, the state of storage subsystem 826 may be transformed—e.g., to hold different data.

Storage subsystem 826 may include removable and/or built-in devices. Storage subsystem 826 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc), among others. Storage subsystem 826 may include volatile, nonvolatile, dynamic, static, read/write, read-only, random-access, sequential-access, location-addressable, file-addressable, and/or content-addressable devices.

It will be appreciated that storage subsystem 826 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 824 and storage subsystem 826 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Communication subsystem 828 may be configured to communicatively couple the display system 800 with one or more other computing devices. Communication subsystem 828 may include wired and/or wireless communication devices compatible with one or more different communication protocols. As non-limiting examples, communication subsystem 828 may be configured for communication via a wireless telephone network, or a wired or wireless local- or wide-area network. In some embodiments, communication subsystem 828 may allow display system 800 to send and/or receive messages to and/or from other devices via a network such as the Internet.

Display system 800 further includes reprojection subsystem 830 to implement depth-aware late-stage reprojection as described in the examples above. For example, reprojection subsystem 830 may receive image data and a depth map for the image data, process the depth map to obtain a blurred depth map, and output the blurred depth map and color pixel data to a frame buffer. Further, reprojection subsystem 830 may determine a translation to make to the image data based upon motion data, and for each pixel of a plurality of pixels in the frame buffer, translate an original ray cast from the original rendering camera's position to an original frame buffer location, e.g. at unprojected sampling coordinates, to a reprojected ray cast from the translated camera location to a reprojected frame buffer location, e.g. at reprojected sampling coordinates. Reprojection subsystem 830 may then sample the color of the pixel at the reprojected sampling coordinates (which corresponds to the location at which the reprojected ray intersects the blurred depth map) for display by display subsystem 834. The reprojection subsystem may be implemented in any suitable manner, such as by GPU or CPU. While shown in FIG. 8 as being separate from controller 822, in some implementations the reprojection subsystem may be a part of a controller.

Display subsystem 834 may include one or more lenses 832, such that images may be displayed via lenses 832 (e.g. via projection onto lenses 832, waveguide system(s) incorporated into lenses 832, and/or in any other suitable manner). Display subsystem 834 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the display subsystem 834 may utilize quantum-dot display technologies, active-matrix organic LED (OLED) technology, and/or any other suitable display technologies.

Head-mounted display system 800 is described for the purpose of example, and thus is not meant to be limiting. It is to be understood that head-mounted display system 800 may include additional and/or alternative sensors, cameras, microphones, input devices, output devices, etc. than those shown without departing from the scope of this disclosure. Head-mounted display system 800 may be implemented as a virtual reality system, or a video or optical augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on head-mounted display system 800 or other suitable display system, or may be executable remotely on a computing system in communication with head-mounted display system 800. It will further be understood that the depth-aware late-stage reprojection method as disclosed herein may be implemented on any other suitable display devices, as latency issues may arise in other display devices configured to display virtual content.

Another example provides a computing system comprising a display, a sensor subsystem, and a reprojection subsystem configured to receive image data to be displayed via the display, receive a depth map for the image data, store the image data in a frame buffer, processing the depth map to obtain a blurred depth map, based upon motion data received from the sensor subsystem, determine a translation to be made to the image data for display, and for each pixel of a plurality of pixels in the frame buffer, based upon the translation determined, translate an original ray extending from an original virtual camera location to a corresponding original frame buffer location to a reprojected ray extending from a translated camera location to a reprojected frame buffer location, determine a location at which the reprojected ray intersects the blurred depth map, and sample a color of a pixel for display based upon a color in the frame buffer corresponding to the location at which the reprojected ray intersects the blurred depth map. The computing system may additionally or alternatively include a head-mounted display device. The reprojection subsystem may additionally or alternatively be configured to display via the display the image data after translating the original ray to the reprojected ray. The reprojection subsystem may additionally or alternatively be configured to make a rotation to the image data based upon motion data received from the sensor subsystem. The reprojection subsystem may additionally or alternatively be configured to process the depth map to obtain the blurred depth map by omitting background values and weights beyond threshold values during a depth map blur convolution. The reprojection subsystem may additionally or alternatively be configured to determine the location at which the reprojected ray intersects the blurred depth map by determining an initial depth value on the blurred depth map corresponding to the original frame buffer location, then determining an initial location on the reprojected ray corresponding to the initial depth value, then determining an updated depth value on the blurred depth map corresponding to the initial location on the reprojected ray, and then determining an updated location on the reprojected ray corresponding to the updated depth value. The reprojection subsystem may additionally or alternatively be configured to determine the location at which the reprojected ray intersects the blurred depth map by iteratively repeating the determining of the updated depth value and the determining of the updated location on the reprojected ray. The reprojection subsystem may additionally or alternatively be configured to iteratively repeat the determining of the updated depth value and the determining of the updated location on the reprojected ray a fixed number of times for each pixel in the frame buffer. The reprojection subsystem may additionally or alternatively be configured to reduce a resolution of the depth map. Any of the above-described examples may be combined in any suitable manner in various implementations.

Another examples provides, on a computing system comprising a display and a sensor subsystem, a method comprising receiving image data to be displayed via the display, receiving a depth map for the image data, storing the image data in a frame buffer, processing the depth map to obtain a blurred depth map, based upon motion data received from the sensor subsystem, determining a translation to be made to the image data prior to display, and for each pixel of a plurality of pixels in the frame buffer, based upon the translation determined, translating an original ray extending from an original virtual camera location to a corresponding original frame buffer location to a reprojected ray extending from a translated camera location to a reprojected frame buffer location, determining a location at which the reprojected ray intersects the blurred depth map, and sampling a color of a pixel in the frame buffer for display at the reprojected frame buffer location based upon a color in the frame buffer corresponding to the location at which the reprojected ray intersects the blurred depth map. The method may additionally or alternatively include displaying via the display the image data after translating the original ray to the reprojected ray for each pixel in the frame buffer. The plurality of pixels may additionally or alternatively include each pixel in the frame buffer. The method may additionally or alternatively include determining the location at which the reprojected ray intersects the blurred depth map by determining an initial depth value on the blurred depth map corresponding to the original frame buffer location, then determining an initial location on the reprojected ray corresponding to the initial depth value, then determining an updated depth value on the blurred depth map corresponding to the initial location on the reprojected ray, and then determining an updated location on the reprojected ray corresponding to the updated depth value. The method may additionally or alternatively include determining the location at which the reprojected ray intersects the blurred depth map by iteratively repeating the determining of the updated depth value and the determining of the updated location on the reprojected ray. The method may additionally or alternatively include iteratively repeating the determining of the updated depth value and the determining of the updated location on the reprojected ray a same number of times for each pixel in the frame buffer. The method may additionally or alternatively include reducing a resolution of the depth map. Any of the above-described examples may be combined in any suitable manner in various implementations.

Another example provides a head-mounted display device comprising a display, a sensor subsystem, and a reprojection subsystem configured to receive image data to be displayed via the display, receive depth data for the image data, store the image data in a frame buffer, process the depth map to obtain a blurred depth map, based upon motion data received from the sensor subsystem, determine a translation to be made to the image data prior to display, and for each pixel of a plurality of pixels in the frame buffer, based upon the translation determined, translate an original ray extending from an original virtual camera location to a corresponding original frame buffer location to a reprojected ray extending from a translated camera location to a reprojected frame buffer location, determine a location at which the reprojected ray intersects the blurred depth map using successive approximation, and sample a color of a pixel in the frame buffer for display at the reprojected frame buffer location based upon a color in the frame buffer corresponding to the location at which the reprojected ray intersects the blurred depth map. The reprojection subsystem may additionally or alternatively be configured to determine the location at which the reprojected ray intersects the blurred depth map using successive approximation by determining an initial depth value on the blurred depth map corresponding to the original frame buffer location, then determining an initial location on the reprojected ray corresponding to the initial depth value, then determining an updated depth value on the blurred depth map corresponding to the initial location on the reprojected ray, and then determining an updated location on the reprojected ray corresponding to the updated depth value. The reprojection subsystem may additionally or alternatively be configured to iteratively repeat the determining of the updated depth value and the determining of the updated location on the reprojected ray a fixed number of times for each pixel in the frame buffer. The reprojection subsystem may additionally or alternatively be configured to determine the translation to be made to the image data based on one or more additional frame buffers and corresponding blurred depth maps. Any of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system comprising a display, a sensor subsystem, and a reprojection subsystem configured to:
   receive image data to be displayed via the display;
   receive a depth map for the image data;
   store the image data in a frame buffer;
   process the depth map to obtain a blurred depth map;
   based upon motion data received from the sensor subsystem, determine a translation to be made to the image data for display; and
   for each pixel of a plurality of pixels in the frame buffer, based upon the translation determined,
      translate an original ray extending from an original virtual camera location to a corresponding original frame buffer location to a reprojected ray extending from a translated camera location to a reprojected frame buffer location,
      determine a location at which the reprojected ray intersects the blurred depth map, and
      sample a color of a pixel for display based upon a color in the frame buffer corresponding to the location at which the reprojected ray intersects the blurred depth map.

2. The computing system of claim 1, wherein the computing system comprises a head-mounted display device.

3. The computing system of claim 1, wherein the reprojection subsystem is further configured to display via the display the image data after translating the original ray to the reprojected ray.

4. The computing system of claim 1, wherein the reprojection subsystem is further configured to make a rotation to the image data based upon motion data received from the sensor subsystem.

5. The computing system of claim 1, wherein the reprojection subsystem is configured to process the depth map to obtain the blurred depth map by omitting background values and weights beyond threshold values during a depth map blur convolution.

6. The computing system of claim 1, wherein the reprojection subsystem is further configured to determine the location at which the reprojected ray intersects the blurred depth map by
   determining an initial depth value on the blurred depth map corresponding to the original frame buffer location,
   then determining an initial location on the reprojected ray corresponding to the initial depth value,
   then determining an updated depth value on the blurred depth map corresponding to the initial location on the reprojected ray, and
   then determining an updated location on the reprojected ray corresponding to the updated depth value.

7. The computing system of claim 6, wherein the reprojection subsystem is further configured to determine the location at which the reprojected ray intersects the blurred depth map by iteratively repeating the determining of the updated depth value and the determining of the updated location on the reprojected ray.

8. The computing system of claim 6, wherein the reprojection subsystem is further configured to iteratively repeat the determining of the updated depth value and the determining of the updated location on the reprojected ray a fixed number of times for each pixel in the frame buffer.

9. The computing system of claim 1, wherein the reprojection subsystem is further configured to reduce a resolution of the depth map.

10. On a computing system comprising a display and a sensor subsystem, a method comprising:
   receiving image data to be displayed via the display;
   receiving a depth map for the image data;
   storing the image data in a frame buffer;
   processing the depth map to obtain a blurred depth map;
   based upon motion data received from the sensor subsystem, determining a translation to be made to the image data prior to display; and
   for each pixel of a plurality of pixels in the frame buffer, based upon the translation determined,
      translating an original ray extending from an original virtual camera location to a corresponding original frame buffer location to a reprojected ray extending from a translated camera location to a reprojected frame buffer location,
      determining a location at which the reprojected ray intersects the blurred depth map, and
      sampling a color of a pixel in the frame buffer for display at the reprojected frame buffer location based upon a color in the frame buffer corresponding to the location at which the reprojected ray intersects the blurred depth map.

11. The method of claim 10, further comprising displaying via the display the image data after translating the original ray to the reprojected ray for each pixel in the frame buffer.

12. The method of claim 10, wherein the plurality of pixels comprises each pixel in the frame buffer.

13. The method of claim 10, wherein determining the location at which the reprojected ray intersects the blurred depth map comprises
determining an initial depth value on the blurred depth map corresponding to the original frame buffer location,
then determining an initial location on the reprojected ray corresponding to the initial depth value,
then determining an updated depth value on the blurred depth map corresponding to the initial location on the reprojected ray, and
then determining an updated location on the reprojected ray corresponding to the updated depth value.

14. The method of claim 13, wherein determining the location at which the reprojected ray intersects the blurred depth map comprises iteratively repeating the determining of the updated depth value and the determining of the updated location on the reprojected ray.

15. The method of claim 14, further comprising iteratively repeating the determining of the updated depth value and the determining of the updated location on the reprojected ray a same number of times for each pixel in the frame buffer.

16. The method of claim 10, further comprising reducing a resolution of the depth map.

17. A head-mounted display device comprising a display, a sensor subsystem, and a reprojection subsystem configured to:
receive image data to be displayed via the display;
receive depth data for the image data;
store the image data in a frame buffer;
process the depth map to obtain a blurred depth map;
based upon motion data received from the sensor subsystem, determine a translation to be made to the image data prior to display; and
for each pixel of a plurality of pixels in the frame buffer, based upon the translation determined,
translate an original ray extending from an original virtual camera location to a corresponding original frame buffer location to a reprojected ray extending from a translated camera location to a reprojected frame buffer location,
determine a location at which the reprojected ray intersects the blurred depth map using successive approximation, and
sample a color of a pixel in the frame buffer for display at the reprojected frame buffer location based upon a color in the frame buffer corresponding to the location at which the reprojected ray intersects the blurred depth map.

18. The head-mounted display device of claim 17, wherein the reprojection subsystem is configured to determine the location at which the reprojected ray intersects the blurred depth map using successive approximation by
determining an initial depth value on the blurred depth map corresponding to the original frame buffer location,
then determining an initial location on the reprojected ray corresponding to the initial depth value,
then determining an updated depth value on the blurred depth map corresponding to the initial location on the reprojected ray, and
then determining an updated location on the reprojected ray corresponding to the updated depth value.

19. The head-mounted display device of claim 17, wherein the reprojection subsystem is further configured to iteratively repeat the determining of the updated depth value and the determining of the updated location on the reprojected ray a fixed number of times for each pixel in the frame buffer.

20. The head-mounted display device of claim 17, wherein the reprojection subsystem is further configured to determine the translation to be made to the image data based on one or more additional frame buffers and corresponding blurred depth maps.

* * * * *